Jan. 5, 1954     R. L. TALBOT     2,664,854
CONTAINER
Filed Sept. 21, 1948
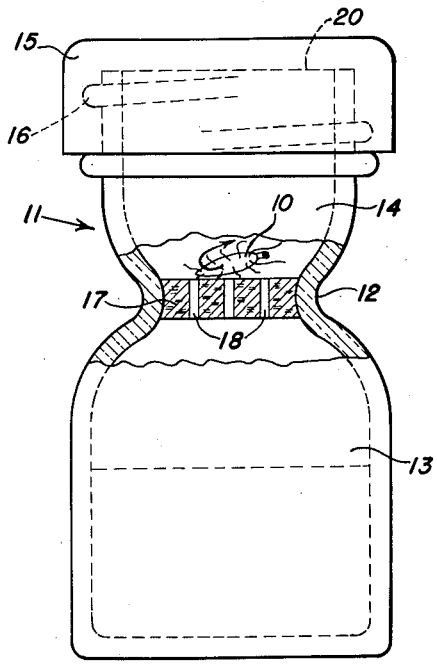
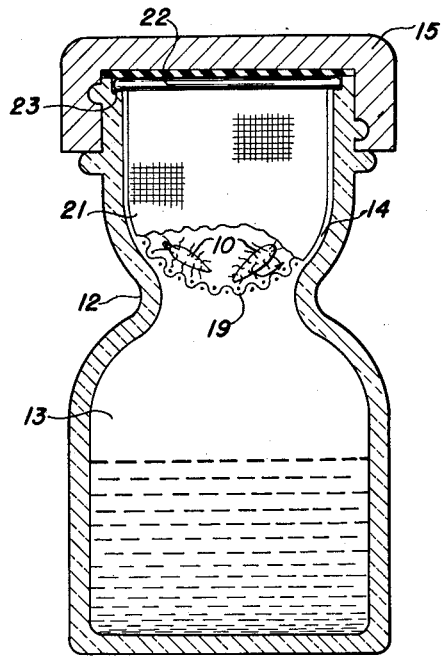
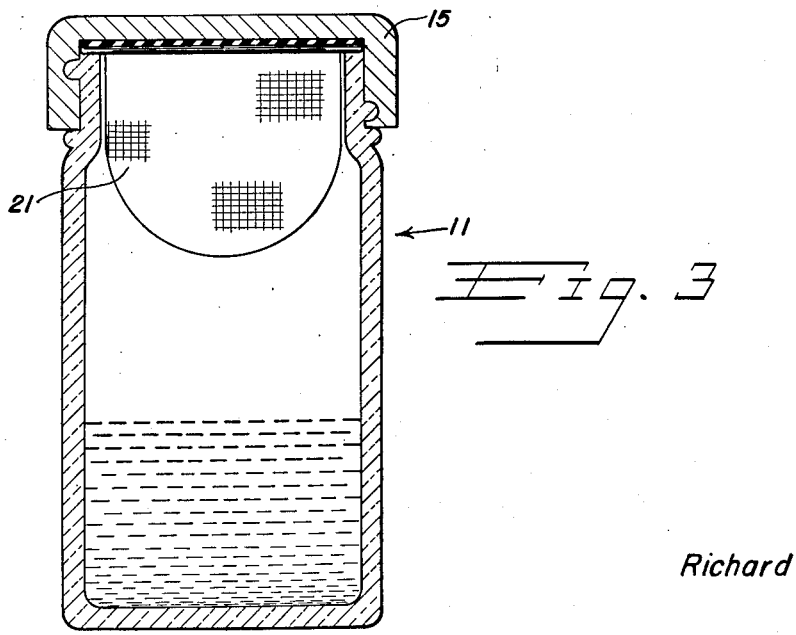
INVENTOR
Richard L. Talbot
By *Strauch & Hoffman*
Attorneys Patented Jan. 5, 1954

2,664,854

UNITED STATES PATENT OFFICE 2,664,854

CONTAINER

Richard L. Talbot, Oshkosh, Wis.

Application September 21, 1948, Serial No. 50,309

2 Claims. (Cl. 118—417)

This invention relates to a container for carrying and treating objects like dry flies for fishing purposes, and is particularly directed to such a container wherein the flies or other objects and a treating liquid are normally disposed in independent compartments and the liquid may be drained into and out of the fly compartment without opening the container.

It has become common practice for fishermen to treat dry flies with a liquid solution with the object of lessening the wetting power of the water on flies cast into a stream, so that the flies ride higher in the water and do not sink, with a resultant more life-like appearance contributing to better fishing.

Heretofore, the usual practice has been to treat the flies by dropping them into a small bottle containing the waterproofing solution, the small size of the bottle being dictated by reason of ease of carrying on the person while fishing, or by emptying the contents of the bottle into a larger container such as a bowl and therein submerging the flies to be treated. Objections to these procedures are the difficulty of removing the flies from the small bottle, or in removing them without loss of solution when inserting a finger into the mouth of the bottle with resultant overflowing, as well as that the solution is necessarily waxy or greasy with resultant objection to handling, and the transferring of the waterproofing solution to the leader through subsequent handling causing the leader to float on the surface of the water and casting a shadow and reducing the possibilities of successful fishing. Other than the inconvenience involved, the chief objection is the loss of solution by reason of evaporation of the solvent therein, or loss resulting by pouring the solution from one container to another.

According to the present invention the solution and the flies may be carried in the same container in separate compartments, or the flies may be dropped into the upper compartment at any time that it is desired to treat them, and the container is so constructed that the fisherman may treat the flies simply by tipping the bottle to enable the solution to enter the upper, or fly, compartment and then reversing the bottle to drain the solution back into the lower compartment so that the treated flies are available for extraction and use without loss of solution. This is an efficient, speedy way of treating dry flies and a most convenient one.

The invention is further applicable to treating and coating or impregnating objects other than flies.

It is, therefore, a major object of my invention to provide a novel container and method of treating dry flies or other objects with a waterproof or other coating or impregnating solution.

It is a further object of my invention to provide a novel multi-compartment container, one compartment of which is adapted to contain dry flies and like objects and the other of which is adapted to contain a treating liquid wherein the container may be reversed to cause the liquid to enter the dry fly compartment to coat or otherwise treat the flies and then reversed upright to drain the dry fly compartment so that the treated flies will be available without encountering the liquid.

A further object of my invention is to provide a novel substantially hour glass shaped container having a removable cap and an intermediate perforated wall separating the container into a lower solution containing compartment and an upper compartment for containing objects to be treated by the solution.

With the above objects in mind, the description proceeds in connection with the appended claims and the annexed drawings wherein:

Figure 1 is a side elevation partly in cross-section of a glass container embodying the invention;

Figure 2 is a cross-section of such a container having a removable compartment arrangement, which also may be used for practicing the invention; and Figure 3 is a cross-section of a further container of different shape also usable in the invention.

Referring to Figure 1, a glass bottle 11 is provided with a restricted intermediate portion, indicated at 12, which gives it an hour-glass shape as viewed from the outside and divides the bottle into a lower compartment 13 below restriction 12 and an upper compartment 14 above the restriction. The lower compartment is of course closed at the bottom by the integral bottom wall of the bottle. The upper compartment is closed at the top by a suitable cap or cover 15 which is tightly secured upon the screw threaded exterior 16 of the bottle. Any suitable washer may be provided between cap 15 and the top of the bottle to make the cover water tight.

Compartments 13 and 14 are separated by an intermediate wall which may be integral with the bottle, a separate member tightly disposed within the restriction 12 or, as illustrated in Figure 2 and as will further be described, may be the bottom of a removable wire basket which serves as the compartment wall isolating the two compartments.

Referring to Figure 1, one form of intermediate wall is indicated at 17 and comprises a cork body provided with a plurality of apertures 18. If desired, this cork body may be cemented to the internal bottle wall at restriction 12 or may be merely friction tight. The size of each hole 18 is such that while it allows liquid to pass through the cork, it does not allow the objects which may be contained in compartment 14 to pass through.

In use, the compartment 13 is partially filled with a liquid with which it is desired to coat the objects placed in compartment 14. This liquid, where the objects in compartment 14 are usually dry flies 10, is in the preferred embodiment of the invention a silicone solution. Usually enough of the solution is placed in compartment 13 that when the bottle is reversed top to bottom from the position in Figure 1, the solution will drain into compartment 14 to substantially fill that compartment and thereby completely cover and coat the flies that are in the compartment.

In practice the invention may be sold as a multiple package containing both the solution and the flies or may be sold as a liquid container with the fisherman himself placing in compartment 14 his selected flies to be coated with the solution whenever he desires. With the flies in compartment 14 and the solution in compartment 13, all that is necessary for the fisherman to do when he desires to use a fly and wishes to reassure himself that it is adequately coated is to up-end the bottle and let the contents of compartment 13 drain into compartment 14 with cover 15 remaining tight all the time, and then after he is satisfied that the flies are coated, upright the bottle to drain the solution back through the intermediate wall 17, remove the cover 15 and extract whatever fly he wishes. It is noteworthy that in this embodiment of the invention the mouth of the bottle indicated at 20 is wide enough to permit the entry of at least the thumb and forefinger of the fisherman in order that he may readily extract the fly.

As above stated, intermediate wall 17 may be fixed or removable, the only requirement being that it remain in fixed position across the restriction 12 while the bottle is closed by cap 15.

Figure 2 illustrates a further embodiment of the invention wherein the intermediate wall at restriction 12 of the bottle comprises the bottom wall 19 of a reticulated thimble or a wire basket 21, which is of such dimension as to substantially line compartment 14 above the restriction 12 and is formed about its upper edge with a rim 22 seating in an internal ledge 23 at the top of the bottle. In this form of the invention, cap 15 keeps the basket or thimble 21 in place with wall 19 located near the restriction 12, and the fisherman may entirely remove the basket or thimble 21 after he has wetted the flies with the solution by reversing the bottle and may spread the flies out on a surface for better selection.

In any event, in the claims herein, wherever the term "intermediate wall" is mentioned, it will be understood that such intermediate wall includes any perforated wall within the bottle that separates the dry fly and coating liquid compartments.

As above indicated, the restriction 12 is desirable but not entirely essential to operation, nor is the hour-glass shape of the bottle essential. For example, the restriction could be an annular internal ledge within a cylindrical bottle.

Where the perforated basket embodiment of Figure 2 is employed, for example, the basket may be fairly shallow as compared to the depth of the bottle, and the liquid level made just enough to cover the basket when the bottle is up-ended.

Figure 3 illustrates a further embodiment of the invention wherein the bottle is a cylindrical jar having rimmed perforated thimble 21 clamped between cap 15 and the top of the bottle. Thus the bottle is not compartmented except when the thimble 21 is in place, the wall of thimble 21 being the intermediate wall corresponding to wall 17 of Figure 1. In operation, the bottle of Figure 3 is up-ended and righted in succession to coat the flies as in the other embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A device for covering the body of an object to be used as a fishing lure to provide the body with a water proof coating comprising a container having upper and lower chambers, the lower chamber being of greater volumetric extent than the upper chamber, said chambers having between them a reduced portion of the body defining a separating plane between the chambers, a perforated device located substantially in the plane of said reduced portion to prevent objects located in the upper chamber from passing into the lower chamber, the upper chamber having a cover removably secured thereto and the lower chamber having a quantity of water proofing coating liquid therein of a volume greater than the volumetric space of the upper chamber whereby complete reversal of the position of the container will cause the liquid of the lower chamber to completely fill the other chamber so as to cause complete coverage of objects in said chamber by said liquid, said upper chamber having its upper end of greater cross sectional dimension than said neck portion so as to facilitate the positioning of a finger of an operator therein to facilitate removal of a coated object when the container has been restored to its initial upright position.

2. The device defined in claim 1 wherein the cross section of each aperture of said perforated device is less than that of the body of the object to be coated.

RICHARD L. TALBOT.

References Cited in the file of this patent

UNITED STATES PATENTS

| Number | Name | Date |
| --- | --- | --- |
| 302,086 | Barton | July 15, 1884 |
| 517,652 | Mann | Apr. 3, 1894 |
| 559,697 | Gallagher | May 2, 1896 |
| 566,067 | Duck | Aug. 18, 1896 |
| 685,736 | Atwell | Nov. 5, 1901 |
| 1,131,120 | Crawford | Mar. 9, 1915 |
| 1,385,207 | Gardon | July 19, 1921 |
| 1,428,388 | Miller | Sept. 5, 1922 |
| 2,048,966 | Perry | July 28, 1936 |
| 2,179,095 | Kelsey | Nov. 7, 1939 |
| 2,399,665 | Deardorff | May 7, 1946 |